United States Patent Office 3,067,155
Patented Dec. 4, 1962

3,067,155
COPOLYMER ACRYLATE-AMINO ACRYLATE AND METAL ISOPROPOXIDE WATER REPELLENT COMPOSITIONS
Edwin B. Michaels, Stamford, Conn., assignor to Stamford Chemical Industries, Inc., Stamford, Conn., a corporation of Delaware
No Drawing. Filed Aug. 17, 1959, Ser. No. 833,909
10 Claims. (Cl. 260—27)

The present invention relates to novel compositions and processes for rendering organic substances water-repellent. More particularly, it relates to novel water-repellent compositions containing surface-active, solvent-soluble copolymers defined hereinafter, and to improved processes for imparting water repellency to fibers, filaments, yarns and fabrics of the natural and synthetic types.

The present invention is a continuation-in-part of my application, Serial No. 667,987, filed June 25, 1957, now United States Patent No. 2,913,427, issued on November 17, 1959. In that application, novel compositions for rendering fibers, filaments, fabrics and yarn water repellent, are disclosed and claimed. The compositions therein defined comprise a mixture of (1) a copolymer prepared by copolymerizing an unsaturated olefinic compound containing a basic nitrogen atom and an oleophilic compound, (2) a compatible solvent for the latter copolymer, (3) a wax substance of paraffin or beeswax and (4) a wax compatible hardening resin, such as ester gum, pentaerythritol abietate, limed rosin, polymerized terpene resin and polymerized petroleum resin. The latter compositions are employed to treat defined organic matter to enhance its water repellency.

It has now been found that the incorporation of certain aluminum alcoholates or zirconium alcoholates in the compositions of the aforementioned allowed application enhances water-repellency of organic matter to an unexpectedly high degree. Water-repellent compositions as above defined and containing either aluminum or zirconium alcoholates find utility in the treatment of fabrics which have been dry-cleaned on a previous occasion. As is known, such dry-cleaned fabrics are characterized as being hydrophilic and resist any water-repellent treatment. Surprisingly, the compositions provided in the present invention permit the ready treatment of such fabrics to an extent heretofor unobtainable. According to the present invention, surface active copolymers which are soluble in a variety of organic solvents and prepared by copolymerizing an unsaturated olefinic compound containing a basic nitrogen atom and an oleophilic compound are deposited on a fabric as by dipping or spraying to render it resistant to spotting by water. However, effective hydrophobing of the fabric can be adequately realized when the fabric is dipped or sprayed into a solvent solution of copolymer, dried and followed by a treatment with a solvent mixture of a suitable wax, ester gum or its equivalent and an aluminum or zirconium aliphatic monohydric alcohol. Alternatively, the fabric may be treated with a mixture comprising a solvent, copolymer, a suitable wax, a wax compatible hardening resin, such as limed rosin; polymerized terpene resin or polymerized petroleum resin, and an aluminum or zirconium alcoholate, such as aluminum isopropoxide, aluminum butoxide, aluminum lauroxide, aluminum stearoxide, zirconium stearoxide and zirconium isopropoxide.

The copolymers of this invention are prepared by methods known in the art. The polymers do not form a part of the invention. However, they may be prepared by copolymerizing catalytically an oleophilic monomer and a basic amino nitrogen monomer in the weight ratio of from 70 to 95 parts of the oleophilic monomer and from 30 to 5 parts of the basic amino nitrogen monomer, respectively. The copolymers are soluble in organic solvents.

The oleophilic monomer may be characterized by the general structure:

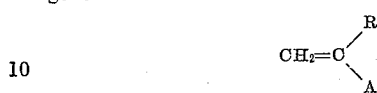

where R is nuclear hydrogen or a methyl radical and A represents the radicals —COOR¹, —OR¹,

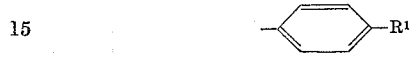

or —OCOR¹, in which R¹ is a higher alkyl radical of from 8 to 18 carbon atoms. Illustratively typical of the latter class of oleophilic monomers is any of the compounds:

Octylacrylate
Decylacrylate
Dodecylmethacrylate
Cetylacrylate
Vinyl dodecyl ether
Dodecylstyrene
Vinyl laurylate The basic amino nitrogen monomer may be characterized by the general formula:

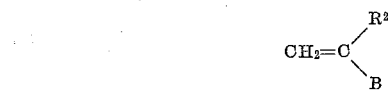

where R² is nuclear hydrogen or methyl and B represents the substituents; —CO₂(CH₂)₂N(R³)₂,

—O—(CH₂)₂N(R³)₂

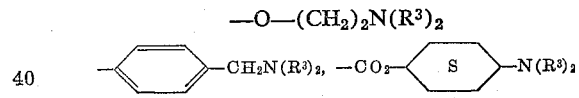

or

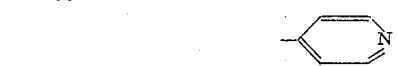

in which R is hydrogen or at least one alkyl radical. In the latter class are illustrated the following compounds:

Diethylamineethyl methacrylate
Vinyl diethylaminoethyl ether
t-Octyl aminoethyl methacrylate
4-dimethylaminomethyl styrene
4-dimethylaminocyclohexyl methacrylate
4-vinyl pyridine In general, when a monomer of each of the above two classes is copolymerized in the indicated proportions and as disclosed, for example, in United States Letters Patent 2,737,452, a soft resinous material results. This copolymer is soluble in a variety of organic solvents, such as aliphatic or aromatic solvents. Illustrative of the latter are naphtha, benzene, toluene, perchlorethylene, xylene and equivalents thereof.

To impart water-repellent properties to the polymers defined above, certain considerations must be observed. First, copolymers are solvent solubilized. For example, one to ten parts of any copolymer, as illustrated by dodecyl methacrylate (70 to 95 parts) and diethylaminoethyl methacrylate (30 to 50 parts), is dissolved in 1000 parts of naphtha, although any of the previously mentioned solvents may be used. Next, a mixture of from about 5 to 25 parts by weight of a suitable wax, such as paraffin or beeswax, from 1 to 15 parts by weight of a previously defined wax-compatible hardening resin and from 0.1 to 1 part by weight of the aluminum alcoholate or zirconium alcoholate is added to the dissolved copolymer while agitating. The order of mixing the dissolved copolymer and paraffin or beeswax is not of critical moment. The composition is found markedly effective for water-repelling purposes.

The alcoholates of either aluminum or zirconium utilized in the present invention are commercially available and are derived from aliphatic monohydric alcohols of from 3 to 18 carbon atoms including isopropyl alcohol, butanol, pentanol, hexanol, octanol, lauryl alcohol, tridecanol, cetyl alcohol and octadecanol. In general, one equivalent of the metal or its oxide derivative is reacted with at least three equivalents of the alcohol under reflux in the presence catalytic amounts of mercury. Thus, one equivalent of aluminum is reacted with three equivalents of isopropyl alcohol to form aluminum isopropoxide whereas one equivalent of zirconium is reacted with four equivalents of isopropyl alcohol to form zirconium isopropoxide. Mixtures of the alcoholates can be used also, if desired. For example, mixtures of either aluminum isopropoxide and aluminum stearoxide in equal or lesser proportions or of aluminum isopropoxide and zirconium isopropoxide are utilized herein with good success.

It is a good practice to employ of from about 0.1 to about 1.0 part of the aforementioned alcoholate in the compositions previously recited. For optimum results, 0.2 part to about 0.7 part by weight of the alcoholate is used.

In general, the copolymer solution of the present invention is applied to a fabric by any method presently used in the art. Among such methods may be mentioned: dipping, roll coating or spraying. Pick-up on the fabric of from about 1–15% or higher by weight of the polymeric material based on the weight of the fabric is usually sufficient to either coat or impregnate the fabric, thus rendering it water-repellent. After the fabric has been so treated, it is exposed to a heated atmosphere as in an oven to drive off the solvent. Usually drying temperatures above room temperature up to about 180° F. are adequate to effect drying.

It is an advantage herein that natural and synthetic fibers are rendered water-repellent by a simplified procedure involving the utilization of the above defined copolymer, a wax and the aluminum or zirconium alcoholate. The fabric so treated remains water-repellent after repeated wear and exposure to normal rainfall. It is further a particular advantage of the invention that laundered or dry-cleaned fabrics may be effectively rendered water-repellent with simplicity and ease.

The following examples will serve to more clearly illustrate the invention. These are merely illustrative and are intended not to be construed as being limitative. Unless otherwise stated, the parts given in this specification are by weight.

EXAMPLES

Several swatches of 6 oz. cotton twill fabric which has been dry-cleaned using 4% detergent charged naphtha solvent are treated with sundry water-repellent compositions and then subjected to (a) the standard resistance to wetting test hereinafter referred to as "RWT" and (b) the resistance to water penetration test hereinafter referred to as "WPT." Both tests are described in the 1956 Technical Manual and Year Book of the American Association of the Textile Chemists and Colorists (AATCC) at pages 128 and 129, respectively.

In the following examples, 7 x 7 inch swatches are immersed in an appropriate treating bath. Each such swatch is next removed from the solution bath and placed in a basket centrifuge extraction occurs therein and is terminated when the weight is uniformly increased to about one-third of the original weight. The extracted fabric is next dried in a circulating air oven maintained at about 130° F. or higher. The test swatches are ironed and, thereafter, are subjected to the tests referred to above.

Two control solutions are employed in the examples and are designed as C1 and C2. In general, these comprise: Stoddards type solvent (1000 parts), paraffin wax of melting point equal to 65° C. (20 parts) and pentaerythritol abietate, M.P.=80–90° C. (12 parts). The latter composition is termed "C1" where a naphtha solution containing 1.25% of copolymer prepared by reacting 90 parts of dodecyl methacrylate and 10 parts of diethylaminoethyl methacrylate is added to the aforementioned control solution (C1), the latter composition is termed "C2."

It is to be noted that any of a variety of commercially available equivalent for naphtha, paraffin wax, pentaerythritol abietate as well as any of the copolymers above defined may be used with equal advantage and with similar enhanced results. The test results are summarized in the table below.

Table

| Example | Type of Treatment | Test | |
|---|---|---|---|
| | | "RWT" [1] (in percent) | "WPT" [2] (in grams) |
| 1 | Fabric+C1 | 43 | 8 |
| 2 | Fabric+C2 | 32 | 2.3 |
| 3 | Fabric+C2+0.6% Aluminum Isopropoxide | 21 | 0.6 |
| 4 | Fabric and C2+0.5% Aluminum Lauroxide | 20.5 | 0.5 |
| 5 | Fabric and C2+0.2% Aluminum Stearoxide | 20.2 | 0.5 |
| 6 | Fabric and C2+0.2% Zirconium Butoxide | 20.3 | 0.5 |

[1] RWT=resistance to wetting test.
[2] WPT=resistance to water penetration test.

It will be readily appreciated that the foregoing table demonstrates substantial enhanced water-repellency utilizing the compositions of the present invention when applied to a previously drycleaned fabric. Similar good results are obtained when the fabric chosen has not been previously dry cleaned.

Although the copolymer employed in the above examples comprise the polymer of dodecyl methacrylate and diethylaminoethyl methacrylate, other previously defined copolymers have been employed with similar enhanced results.

I claim:

1. In a process for rendering matter in the form of a fiber, filament, yarn and fabric water repellent by treating the same with a resinous composition the improvement comprising the steps of: applying to said matter a water repellent liquid composition containing a mixture essentially of:

(a) from about one to about ten parts by weight of a copolymer dissolved in about 1000 parts by volume of a compatible organic solvent therefor, said copolymer being prepared by copolymerizing of from about 70 to 95 parts by weight of an oleophilic monomer characterized by the formula:

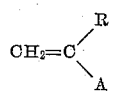

in which R is a radical selected from the group consisting of hydrogen and methyl and in which A is a substitutent taken from the group consisting of

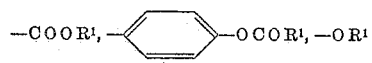

and

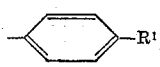

in which $R^1$ is an alkyl radical of 8 to 18 carbon atoms, and of from about 5 to about 30 parts by weight of a basic amino monomer represented by the general formula:

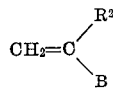

in which $R^2$ is a radical selected from the group consisting of hydrogen and methyl and in which B is a substituent selected from the group consisting of $-COO(CH_2)_2N(R^3)_2$, $-O(CH_2)_2N(R^3)_2$,

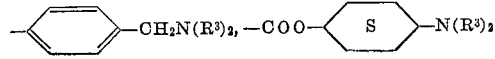

and

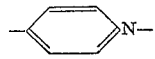

in which $R^3$ is a radical consisting of hydrogen and lower alkyl, (b) from about five to about twenty-five parts by weight of a wax-like substance selected from the group consisting of paraffin and beeswax, (c) from about one to about fifteen parts by weight of a compatible wax hardening resin selected from the group consisting of ester gum, pentaerythritol abietate, limed rosin, polymerized terpene resin and polymerized petroleum resin, (d) from about 0.1 part, and to about 1 part of a metal alcoholate wherein said alcoholate is obtained from the reaction of three equivalents of an aliphatic monohydric alcohol of from 3 to 18 carbon atoms and one equivalent of a metal is selected from the group consisting of aluminum and zirconium, and thereafter drying the matter so-treated whereby from about one to about fifteen percent by weight of said copolymer adheres thereto.

2. A process according to the claim 1 in which the material to be treated is a fabric.

3. A process according to claim 1 in which the material to be treated is a dry-cleaned fabric.

4. A process according to claim 1 in which the water repellent mixture is applied to said matter by the immersion of the matter in said liquid water repellent mixture containing of from 0.1 to 1.0 part of aluminum isopropoxide based on weight of said copolymer.

5. A process according to claim 1 in which the copolymer is prepared by copolymerizing of from about 70 to 95 parts of dodecyl methacrylate and from about 5.0 to about 30 parts of diethylaminoethyl methacrylate, all on a weight basis.

6. A process according to claim 1 in which the copolymer is prepared by the copolymerization of 90 parts by weight of dodecyl methacrylate and 10 parts by weight of diethylaminoethyl methacrylate and the organic solvent is naphtha.

7. A process according to claim 1 in which the wax substance is paraffin and the wax compatible hardening resin is pentaerythritol abietate.

8. A composition adapted for rendering matter in the form of a fiber, filament, yarn and fabric water repellent comprising essentially a mixture of:

(a) from one to about ten parts by weight of copolymer dissolved in a compatible organic solvent therefor, said copolymer being defined in claim 1, (b) from about five to about twenty-five parts by weight of a wax substance selected from the group consisting of paraffin and beeswax, (c) from about one to about fifteen parts of a compatible wax hardening resin selected from group consisting of ester gum, pentaerythritol abietate, limed rosin, polymerized terpene resin and polymerized petroleum resin, and (d) from about 0.1 part, and to about 1 part of a metal alcoholate wherein said alcoholate is obtained from the reaction of three equivalents of an aliphatic monohydric alcohol of from 3 to 18 carbon atoms and one equivalent of a metal selected from the group consisting of aluminum and zirconium.

9. The composition of claim 8 in which the organic solvent is naphtha, the wax substance is paraffin, the wax compatible hardening resin is pentaerythritol abietate the metal alcoholate in an aluminum isopropoxide and the copolymer is prepared by reacting of from about 70 to about 95 parts by weight of dodecyl methacrylate and from about 5 to about 30 parts by weight of diethylaminoethyl methacrylate.

10. The process composition of claim 8 in which the copolymer is prepared by the copolymerization of 90 parts by weight of dodecyl methacrylate and 10 parts by weight of diethylaminoethyl methacrylate.

References Cited in the file of this patent

UNITED STATES PATENTS

| | | |
|---|---|---|
| 2,670,303 | Mailander | Feb. 23, 1954 |
| 2,823,144 | Dalton | Feb. 11, 1958 |
| 2,913,427 | Michaels | Nov. 17, 1959 |